(12) United States Patent
Tong et al.

(10) Patent No.: US 8,596,652 B2
(45) Date of Patent: Dec. 3, 2013

(54) BATTERY-POWERED MOTORIZED VEHICLE WITH A CARRYING PLATFORM

(76) Inventors: Lucas Hou-Wae Tong, Mountain View, CA (US); Colina Tong, Mountain View, CA (US)

(*) Notice: Subject to any disclaimer, the term of this patent is extended or adjusted under 35 U.S.C. 154(b) by 547 days.

(21) Appl. No.: 12/802,116

(22) Filed: May 29, 2010

(65) Prior Publication Data
US 2010/0300790 A1 Dec. 2, 2010

Related U.S. Application Data

(60) Provisional application No. 61/217,286, filed on May 29, 2009, provisional application No. 61/270,442, filed on Jul. 8, 2009, provisional application No. 61/313,224, filed on Mar. 12, 2010.

(51) Int. Cl.
| | | |
|---|---|---|
| *B62M 6/00* | (2010.01) | |
| *B62D 61/02* | (2006.01) | |
| *B62D 61/10* | (2006.01) | |
| *B62D 61/12* | (2006.01) | |

(52) U.S. Cl.
USPC .................. 280/47.19; 280/47.2; 180/220

(58) Field of Classification Search
CPC ........................................................ B62B 1/08
USPC ........ 280/30, 47.18, 655, 648, 650, 639, 278, 280/32.7, 62, 47.19, 47.2, 38, 39, 755, 280/124.111, DIG. 5, 86.5; 180/208, 209, 180/214, 907, 210, 211, 218, 219, 220, 221, 180/223, 65; 190/18 A; D21/435
See application file for complete search history.

(56) References Cited

U.S. PATENT DOCUMENTS

| | | | | |
|---|---|---|---|---|
| 3,580,349 | A * | 5/1971 | Brennan et al. | 180/208 |
| 3,605,929 | A * | 9/1971 | Rolland | 180/208 |
| 3,897,960 | A * | 8/1975 | Cosby | 280/755 |
| 4,750,578 | A * | 6/1988 | Brandenfels | 180/13 |

(Continued)

OTHER PUBLICATIONS

Leslie, EIC 2600 Search report, STIC, Aug. 2, 2013.*

(Continued)

*Primary Examiner* — Karen Beck

(57) ABSTRACT

One embodiment of a battery-powered motorized vehicle for a user includes a riding platform, a steering wheel, a second-end wheel, a seat base, a battery-powered motor, a carrying platform, a swivel wheel, a hinge, and an attachment device. The riding platform includes a first end and a second end. The steering wheel is in proximity to the first end of the riding platform. The second-end wheel is close to the second end of the riding platform. The seat base can be on top of the riding platform, with the seat base including a seat back. The battery-powered motor is configured to drive the second-end wheel. The carrying platform includes a first end and a second end. The swivel wheel is configured to connect to the bottom of the carrying platform. The hinge is configured to connect the first end of the carrying platform to a back surface of the seat base. The attachment device is configured to secure an article to the carrying platform. The carrying platform, via the hinge, can be configured to be in the downward position with the swivel wheel touching the ground to carry the article. The carrying platform can also be configured to be held in an upward position with the swivel wheel lifted off the ground when not carrying the article, to make the motorized vehicle more maneuverable.

23 Claims, 7 Drawing Sheets

(56) References Cited

U.S. PATENT DOCUMENTS

| | | | | |
|---|---|---|---|---|
| 5,036,938 | A * | 8/1991 | Blount et al. | 180/208 |
| 5,282,641 | A * | 2/1994 | McLaughlin | 280/432 |
| 5,727,642 | A * | 3/1998 | Abbott | 180/65.1 |
| 5,927,730 | A * | 7/1999 | Sattler | 280/47.131 |
| 6,176,337 | B1 * | 1/2001 | McConnell et al. | 180/208 |
| 7,004,272 | B1 * | 2/2006 | Brown et al. | 180/65.1 |
| 7,083,018 | B2 * | 8/2006 | Luh | 180/65.1 |
| D541,701 | S * | 5/2007 | Vasant | D12/86 |
| 7,243,746 | B1 * | 7/2007 | Vasant | 180/6.5 |
| 7,431,311 | B2 | 10/2008 | Turner et al. | |
| 7,493,711 | B2 * | 2/2009 | Gautreau et al. | 37/249 |
| 7,562,903 | B2 * | 7/2009 | Kramer et al. | 280/755 |
| 7,942,445 | B2 * | 5/2011 | Kramer et al. | 280/755 |
| 8,091,658 | B2 * | 1/2012 | Peng | 180/65.1 |
| 2005/0167937 | A1 * | 8/2005 | Gottschalk | 280/86.5 |
| 2007/0126196 | A1 * | 6/2007 | Klahn | 280/86.5 |
| 2007/0144799 | A1 * | 6/2007 | Vasant | 180/65.1 |
| 2009/0000835 | A1 * | 1/2009 | Jones et al. | 180/65.1 |
| 2009/0314568 | A1 * | 12/2009 | Brown et al. | 180/209 |
| 2010/0096204 | A1 * | 4/2010 | Mosey et al. | 180/210 |
| 2011/0266772 | A1 * | 11/2011 | Andre | 280/408 |

OTHER PUBLICATIONS

"Electric Motorcycles and Scooters," last modified Jan. 28, 2010, Wikipedia, http://en.wikipedia.org/wiki/Electric_motorcycles_and·scooters, pp. 1-5.

"Go-Go Elite Traveller," Pride Mobility Products Corp., http://www.pridemobility.com/pdf/brochures/gogo/GoGoEliteTraveller.pdf, pp. 1-3, provided May 29, 2013.

Image File, downloaded Feb. 12, 2010, http://platinumgalleria.com/razor-electric-scooter-seated-e300s.jpg, 1 page.

Image File, downloaded Feb. 12, 2010, http://platinumgalleria.com/razor-electric-scooter-e300.jpg, 1 page.

Oster et al., "E-Yikes! Electric Bikes Terrorize the Streets of China," Jan. 17, 2010, The Wall Street Journal, http://online.wsj.com/article/SB10001424052748703657604575005140241751852.html, pp. 1-3.

Razor E100 Electric Scooter—Razor USA, copyright 2003-2009 by Razor USA LLC, http://www.razor.com/products/e100-electric-scooter.php, pp. 1-4.

* cited by examiner

BATTERY-POWERED MOTORIZED VEHICLE WITH A CARRYING PLATFORM

CROSS REFERENCE TO RELATED APPLICATION

This application claims benefit of (a) U.S. Provisional Patent Application No. 61/217,286, by Tong et al., filed May 29, 2009, entitled "Battery-powered motorized rolling backpack"; (b) U.S. Provisional Patent Application No. 61/270,442, by Tong et al., filed Jul. 8, 2009, entitled "Battery-powered motorized rolling backpack"; and (c) U.S. Provisional Patent Application No. 61/313,224, by Tong et al., filed Mar. 12, 2010, entitled "Car-Pac, a battery-powered motorized vehicle with a rolling backpack"; all of which are hereby incorporated herein by reference.

BACKGROUND OF THE INVENTION

1. Field of the Invention

The present invention relates generally to battery-powered motorized vehicle and more particularly to battery-powered motorized vehicle to carry articles.

2. Description of the Related Art

Back breaking, legs aching, shoulders burning—Three feelings kids feel whenever they walk to school carrying their heavy backpacks. Thankfully, people have invented rolling backpacks to ease their pain. Unfortunately, rolling backpacks typically do not fit on bikes. Clearly it is desirable to find relatively inexpensive alternatives to help kids take rolling backpacks to schools.

SUMMARY OF THE INVENTION

One embodiment includes a relatively inexpensive battery-powered motorized vehicle that can hold a rolling backpack. The embodiment can be called a Car-Pac. Not only would the embodiment reduce the students' pain, parents may buy them so they would not have to drive their kids to school. The embodiment includes a battery-powered motorized two-wheeler with a carrying platform at the back to hold a rolling backpack. There can be a swivel wheel under the platform. There can also be an attachment device to secure the backpack on the carrying platform. If there is no backpack to carry, the platform can be held up by a holding device to make the embodiment more maneuverable and hence more fun to drive.

Other aspects and advantages of the present invention will become apparent from the following detailed description, which, when taken in conjunction with the accompanying drawings, illustrates by way of example the principles of the invention.

Same numerals in FIGS. 1-5 are assigned to similar elements in all the figures. Embodiments of the invention are discussed below with reference to FIGS. 1-5. However, those skilled in the art will readily appreciate that the detailed description given herein with respect to these figures is for explanatory purposes as the invention extends beyond these limited embodiments.

DETAILED DESCRIPTION OF THE INVENTION

Figure 1A:
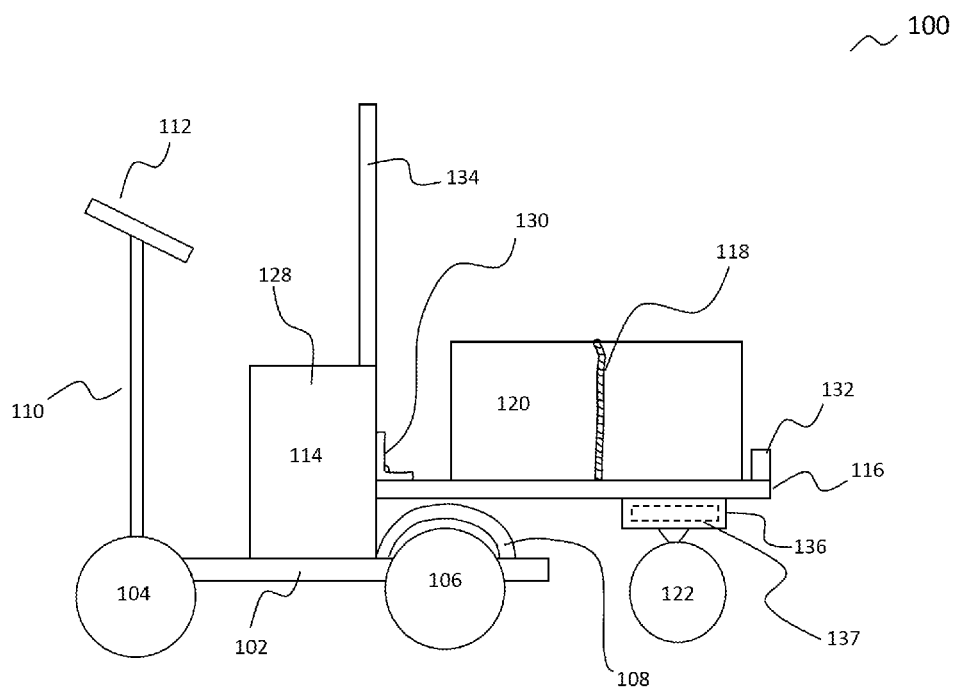
FIGS. 1A-C show a battery-powered motorized vehicle with a carrying platform according to different embodiments of the invention.
Figure 1B:
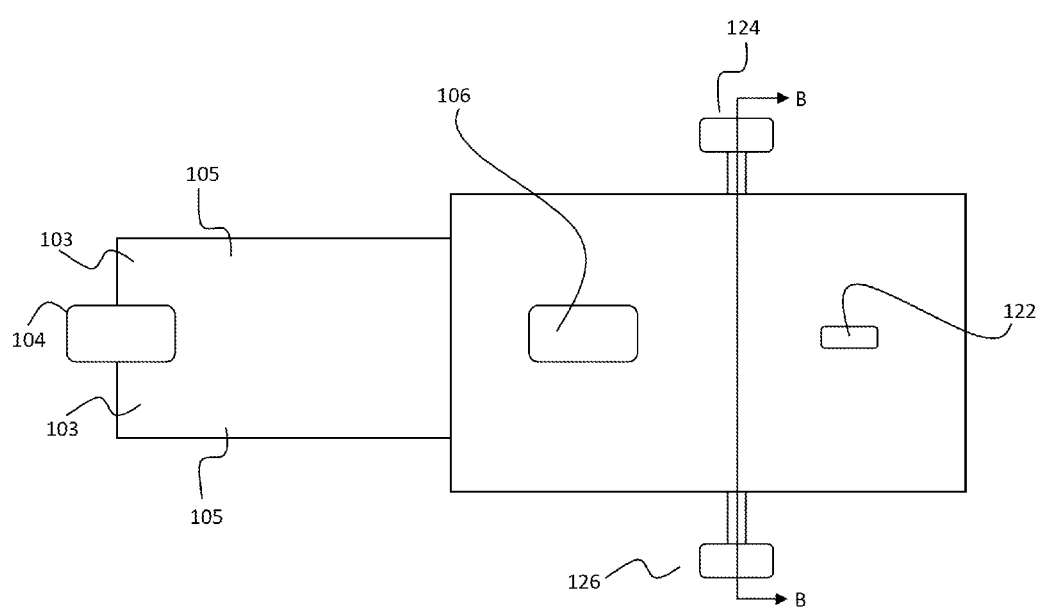

FIG. 1A shows one embodiment 100 of a relatively inexpensive motorized vehicle that is typically battery-powered. The embodiment can carry objects, such as suit cases, brief cases, rolling backpacks or other articles. The embodiment includes a first frame 102, which has a first end and a second end. This first frame 102 can also be called a riding platform. There can be a wheel 104 close to the first end of the riding platform. This wheel can turn and can be used for steering (the steering wheel). Close to the second end of the frame, there can be another wheel 106 (the second-end wheel), and this wheel does not turn. There can be a brake at the steering wheel 104. In another approach, a brake can be at the second-end wheel, or there can be brakes at both the steering and second-end wheels. There can be a cover 108 over the second-end wheel 106.

One embodiment can be battery powered. The battery can be supported by a battery tray, which can be held by or attached to the bottom of the riding platform 102. In one embodiment, there can be a motor in between the battery and the second-end wheel. The motor can have a motor gear. The second-end wheel 106 can have an axel, with an axel gear. The motor gear can be connected to the axel gear by a chain. When the motor turns, the motor gear turns the axel gear through the chain. As the axel gear turns, the second-end wheel turns. The speed of the embodiment can depend on the gear ratio between the motor gear and the axle gear.

In one embodiment, there can be a switch that changes the polarity of the battery running the motor. This switch can be used to run the system forward or backward by changing the polarity of the battery in running the motor.

In one embodiment, there can be a post 110. At one end of the post, there can be a steering bar 112. The other end of the post can be close to the first end of the riding platform 102. There can be a fork (or a fork-like structure) at the other end. The fork can hold onto the steering wheel 104. Close to the head of the fork, there can be a tube surrounding the post 110, allowing the post 110 to freely rotate relative to the tube. The tube can be attached close to the first end of the riding platform 102. In one approach, the steering wheel 104 can be turned by turning the steering bar 112. The steering bar 112 can have two ends. There can be a throttle at one end of the steering bar. The throttle can be used for motor throttling. There can be a brake lever at the other end of the steering bar to control the brake, such as at the steering wheel 104. In another embodiment, there is also a speed controller at the steering bar 112. The speed controller can be adjacent to the throttle. The speed controller can have a number of positions to indicate different speeds, such as slow to fast speed. Techniques to implement a number of the above features, such as the electronics, should be obvious to those skilled in the art, and will not be further described.

In one embodiment, on top of the riding platform 102, there can be a seat base 114 for a user to sit on. The seat base 114 can be a single-person seat base, positioned between the steering wheel 104 and the second-end wheel 106.

In one embodiment, behind the seat base 114, closer to the second end than the first end of the riding platform 102, there includes a carrying platform 116. The carrying platform 116 includes two ends, a first end and a second end. The first end of the carrying platform 116 can be connected to a back surface of the seat base 114 by a hinge 130. The hinge 130 does not have to be directly connected to the seat base 114. In one embodiment, the hinge 130 can be indirectly connected to the seat base 114, by, for example, having the hinge 130 connected to a physical structure, which, in turn, can be connected to the seat base 114.

In one embodiment, at or in proximity to the second end of the carrying platform 116, there can be a bar or guard rail 132. In another embodiment, not just at the second end of the carrying platform 116, there can be additional guard rails, such as one on each of the two sides of the carrying platform also. The one or more guard rails can help reduce the chance for an article on top of the carrying platform 116 from falling off the carrying platform 116.

In one approach, the hinge 130 helps reduce the chance of the carrying platform 116 from being broken from the riding platform 102. Depending on the strength of the connection and the length of the carrying platform 116, if the carrying platform 116 is permanently fixed in position to the riding platform 102, the carrying platform can break, such as from the riding platform 102, if the embodiment goes quickly through a dip, or goes downward and then upward in a relatively sharp manner. The hinge 130 provides the flexibility to reduce the chance of breaking.

In one embodiment, connected to the carrying platform 116, there can be an attachment device 118 configured to secure or to tie a backpack 120, a luggage or other article to the carrying platform. For example, the attachment device can be located close to the middle of the carrying platform. In one approach, the attachment device 118 can be based on strings or ropes. For example, around the middle of the carrying platform, on each side, there is a piece of rope. The two pieces of rope can be connected together by an adjustable knot (or, the knot's position being adjustable). To secure a rolling backpack on the carrying platform, a student can wrap the two pieces of rope around the backpack and then adjust the knot position till the two pieces of ropes tightly bind the backpack over the carrying platform. In another approach, the attachment device can be based on belts or straps, using Velcro or other mechanisms, to bind the straps or belts together. In yet another embodiment, the attachment device includes a retractable belt, with the belt going from one side of the carrying platform to the other side. The belt can be removably fastened by a standard locking mechanism at the other side.

FIG. 1A shows an example of the carrying platform 116 in a downward position. In one embodiment, connected to the bottom of the carrying platform 116, there can be an extra wheel 122. The extra wheel 122 can be a swivel wheel, which can reduce friction, such as in turning, making the embodiment easier to maneuver. With just one wheel under the carrying platform, the embodiment can turn faster, and can make sharper turns than if there are two spaced-apart wheels under the platform. Though two spaced-apart wheels can be more stable, a single swivel wheel can be more fun for kids to drive.

In one embodiment, the swivel wheel 122 can be, for example, close to the second end of the carrying platform 116. The centers of the three wheels—the swivel wheel 122, the steering wheel 104 and the second-end wheel 106—can be substantially in a straight line. With the extra wheel, when the carrying platform 116 is in the downward position, such as substantially parallel to the ground, the carrying platform 116 can be supported by the swivel wheel. In another embodiment, the carrying platform 116 does not have the swivel wheel 122, and the carrying platform 116 touches and is supported by the cover 108 of the second-end wheel 106.

In one embodiment, when the carrying platform 116 is in the downward position, the hinge 130 can be opened into around 90 degrees. In one embodiment, there can be a locking mechanism locking the carrying platform 116 in this downward position.

Figure 1C:
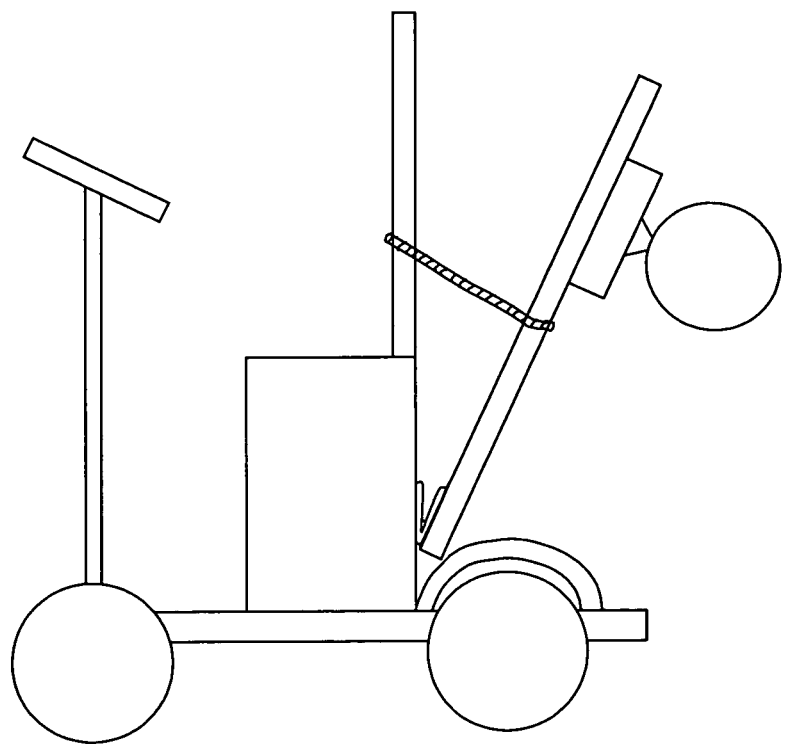

With the carrying platform 116 in the downward position, an article, such as a backpack, can lay or sit on top of the carrying platform 116. If there is nothing to carry, in one embodiment, the carrying platform 116 can be lifted up, with the swivel wheel 122 off the ground. In such a configuration, the embodiment 100 can be easier to maneuver, making the embodiment more fun to drive. FIG. 1C shows an embodiment with the carrying platform 116 being lifted up, such as the angle between the carrying platform 116 and the back surface of the seat base being, for example, 20 degrees.

In one approach, a holding device can be used to keep the carrying platform 116 in the upward position. In one embodiment, the attachment device 118 can also contribute as the holding device. To illustrate, with ropes for the attachment device 118, a student can wrap the two pieces of rope around the seat back 134 and then adjust the knot position till the carrying platform is in a sufficiently upward position. The two pieces of rope can be tied together in an area close to the seat base.

In one embodiment, the steering wheel 104 and the second-end wheel 106 can have a larger diameter than the swivel wheel 122. A larger steering and second-end wheels can provide a smoother ride. If the swivel wheel is much smaller than the first-end and second-end wheel, the swivel wheel would need a long extension arm 136 to connect to the carrying platform 116. A long extension arm 136 can be heavy. One approach reduces the weight of the extension arm 136 by making the extension arm a hollow structure.

In one embodiment, the steering wheel 104 and the second-end wheel 106 can have a larger diameter than the swivel wheel 122. A larger steering and second-end wheels can provide a smoother ride. If the swivel wheel is much smaller than the first-end and second-end wheel, the swivel wheel would need a long extension arm 136 to connect to the carrying platform 116. A long extension arm 136 can be heavy. One approach reduces the weight of the extension arm 136 by making the extension arm a hollow structure 137.

In one embodiment, there can be two more supporting wheels on the sides of the carrying platform 116. For example, the supporting wheels can be training wheels. There can be two supporting wheels, one 124 on the right side and another 126 on the left side of the carrying platform 116. In normal operation, these supporting wheels do not touch the ground when the embodiment is standing in its upright position. In one embodiment, these supporting wheels can support the embodiment when the embodiment is turning. An embodiment with just three wheels substantially along the same line (such as the steering wheel, the second-end wheel and the swivel wheel) can make relatively sharp turns. As a person makes a sharp turn, the person can lean into the turning direction. If there is insufficient friction at, for example, the second-end wheel 106, the wheel 106 can skid and the person can fall. With the supporting wheels, when the second-end wheel 106 wants to skid, one of the supporting wheels can be touching the ground and reduce the chance of skidding and falling.

In one embodiment, the seat base 114 can be configured to be used as a container, and can be hollow, with the space inside used to contain materials. As shown, for example, in FIG. 4, there can be a door 304 at a side surface of the seat base 114. In one embodiment, the door opens forward, such as in the direction from the second-end wheel 106 to the steering wheel 104. Then when the embodiment is moving forward, wind will help close the door. In one approach, the edge of the door can include spongy materials, which helps to keep the door in its place when the door is closed. Also, the spongy materials help reduce the chance of water to get inside the seat base. In one embodiment, the top surface 128 of the seat base 114 is larger than or extends beyond the door or the seat base to serve as a shield or cover over the door. In another embodiment, a door 306 can be at the top surface 128 of the seat base 114. In yet another embodiment, the top surface of the seat base 114 also serves as a door.

In one embodiment, there can be an inside door 308 at the bottom of the container, or the space inside the seat base. And this embodiment is powered by one or more batteries, and the one or more batteries can be below the inside door. Opening the inside door can expose the battery, allowing a user to access and replace the one or more batteries in the battery tray 302.

With the embodiment shown in FIG. 1A, a student can place a rolling backpack on the carrying platform 116, and secure the backpack by the attachment device 118. Then the student can drive the backpack to school. When the student reaches school, the student can remove the rolling backpack from the embodiment, and roll the backpack to classrooms.

One embodiment includes one or more footrest. For example, the riding platform 102 is wider than the seat base 114. As shown, for example, in FIG. 1B, for a student who feels more comfortable seating with his knees further apart, he can rest his shoes at footrests 105, on the two sides of the seat base 114. However, for a student who feels more comfortable with her knees closer together in sitting, she can rest her shoes at footrests 103, in front of the seat base 114. Another embodiment does not include footrest on the two sides of the seat base 114. The student can rest his shoes either on the riding platform 102 in front of the seat base 114, or the student can rest his shoes on the ground next to the two sides of the seat base 114.

To start an embodiment to move, in one approach, after turning on an on/off switch for the motor, a student turns a throttle at one end of the steering bar 112 to start the embodiment moving.

Another embodiment needs to be manually pushed to start. For example, a student uses at least one of his legs to push-start by pushing the embodiment forward. As the embodiment starts moving, the student can twist the throttle at one end of the steering bar to give power to the motor.

Figure 2:
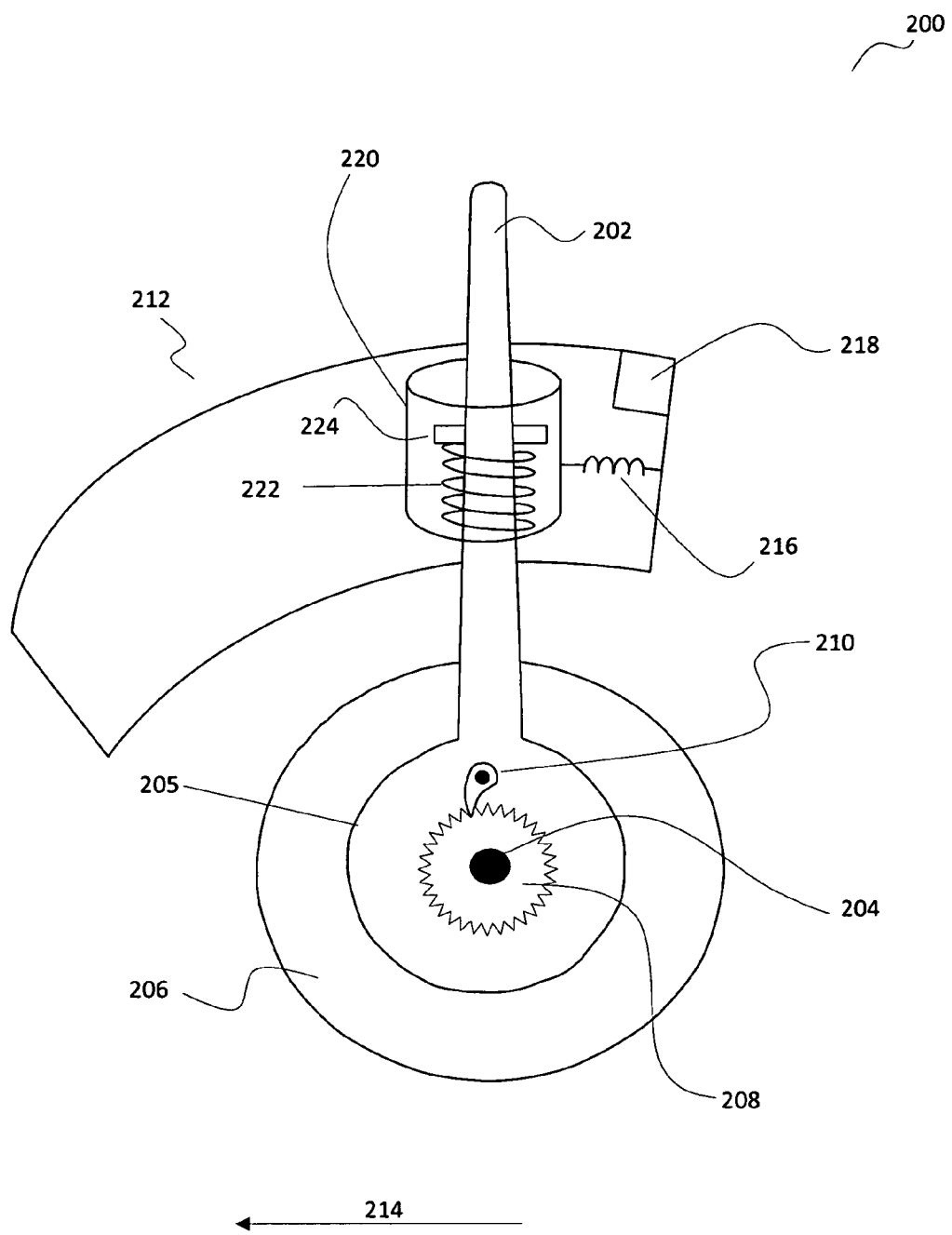
FIG. 2 shows a thruster according to one embodiment of the invention.
Figure 3:
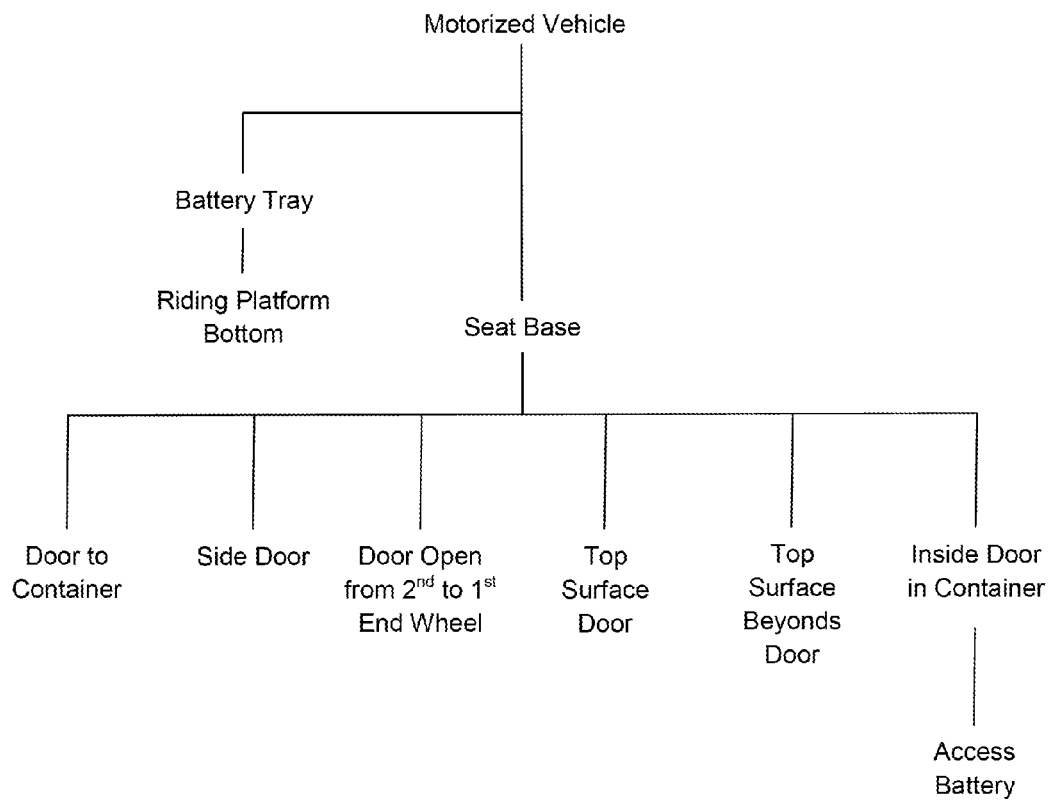
FIG. 3 shows a number of embodiments of the invention.
Figure 4:
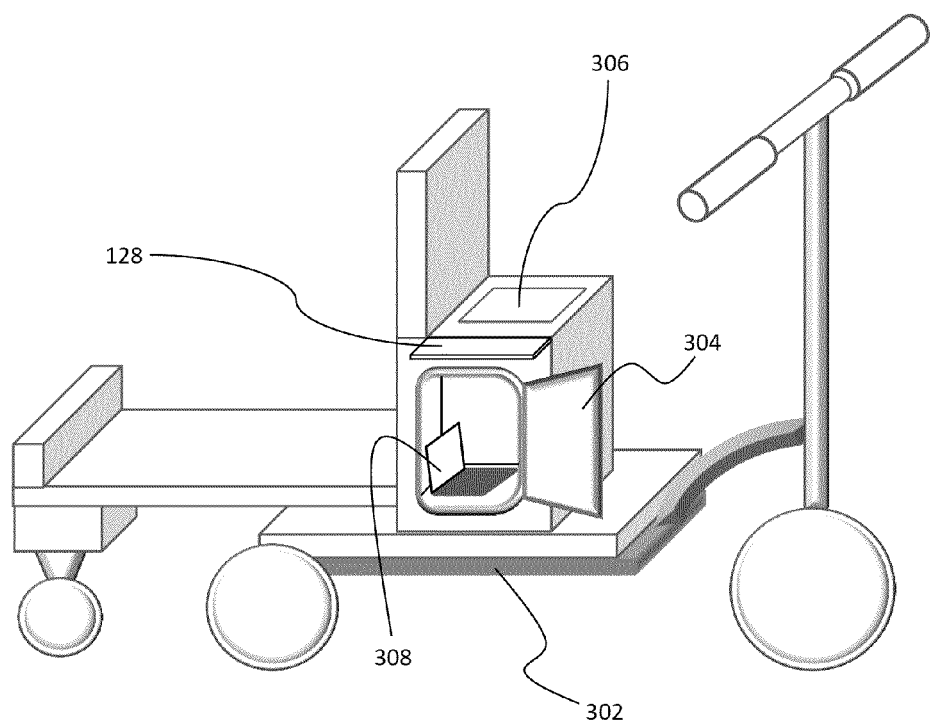
FIG. 4 shows embodiments of the invention, including schematically showing a number of embodiments of FIG. 3.
Figure 5:
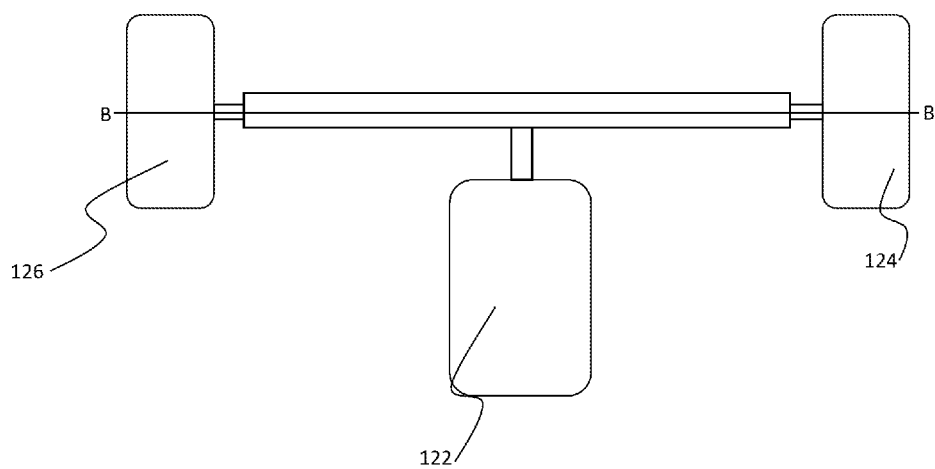
FIG. 5 shows a schematic diagram of a cross-sectional view BB of FIG. 1B according to an embodiment of the invention.

Instead of pushing with the student's leg, one embodiment includes a thruster to help push-start the embodiment. The thruster can be attached adjacent to the seat base 114. In one approach, when the student pushes the thruster forward along a rail, the embodiment moves forward. FIG. 2 shows one embodiment of a cross-section of such a thruster 200. In this embodiment, the rail 212 can be attached to a side surface of the seat base 114. The side surface can be on the right side (such as for a right-handed person), or on the left side (such as for a left-handed person) of the seat base 114.

In one approach, the thruster 200 includes a handle rod 202. The base of the rod can be in the shape of, or can be connected to, a plate or a disk 205. The center of the disk 205 substantially coincides with an axel 204. Fixed to the axel 204 is a ground wheel 206 and a gear (or a toothed wheel) 208. Also, the center of the ground wheel 206 substantially coincides with the center of the disk 205. As the handle rod 202 is pushed forward along the rail 212, the handle rod 202 is substantially fixed to the toothed wheel 208 by a pawl 210 at the disk 205. Then the tooth wheel 208 and the ground wheel 206 are pushed counterclockwise, which in turn pushes the embodiment forward, along the direction 214. As the handle rod 202 is pulled backward along the rail 212, the toothed wheel 208 is released from the pawl 210. The handle rod 202 is in turn released from the toothed wheel 208, and can go back to its starting position. There can be a stopper 218 to mark the starting position. The stopper 218 can be a cushion, a piece of elastic material or just a piece of wood.

In another approach, the thruster 200 includes a retracting device 216 that is connected to the handle rod 202. After the handle rod 202 is released from being pushed forward along the rail 212, the retracting device 216 pulls the handle rod 202 back to its starting position. For example, the retracting device 216 can be a spring, a bungee cord, or an elastic cord.

In another approach, the ground wheel 206 does not touch the ground when it is not in use. Instead the thruster 200 includes a ground-touching device 220. In one embodiment, the ground-touching device 220 includes a container with a spring 222. In one embodiment, the bottom end of the spring 222 can be at the bottom of the container, and the top end of the spring can be tied to the handle rod 202. In another embodiment, the top end of the spring touches a disk 224 or a stopping mechanism 224, which is fixed to the handle rod 202. As a user pushes the handle rod 202 downwards, the spring will be compressed and the ground wheel 206 will touch the ground. As the user stops pushing downward or releases the handle rod 202, the spring 222 expands, and the handle rod 202 is pushed upwards, pulling the ground wheel 206 up from the ground. Then the ground-touching device 220 is in the relaxed position, with the ground wheel 206 not touching the ground.

A number of embodiments have been described that are battery-powered. In yet another embodiment, the source of power can be based on or augmented by, for example, a solar cell or a fuel cell.

A number of embodiments have been described for a student using a rolling backpack. In other embodiments, the different embodiments can be used by other users, and they can use them to carry a luggage or other articles.

In one embodiment, the article can be a person. Using the embodiment where the carrying platform is directly connected to the back surface of the seat base, the person can be sitting with his back leaning on the back surface, with his feet on the carrying platform. In one approach, to increase stability, instead of one swivel wheel 122 under the carrying platform 116, there can be two spaced-apart wheels, both close to the second end, with one on each side, of the carrying platform 116. For example, the distance between the centers of the two wheels can be close to the width of the carrying platform 116. Such an embodiment may not be able to make as sharp a turn as the single swivel wheel 122. In one approach, the embodiment can include an attachment device, which can be similar to a seat belt, to make it safer for the person to sit. For example, the attachment device includes a retractable belt, which can be used to tie around the person. The dispenser of the retractable belt can be at one side of the carrying platform, and a locking mechanism to receive the retractable belt can be at the opposite side of the carrying platform; both can be close to the hinge area. In another approach, the dispenser and the locking mechanism can be at the seat base, one on the left side and the other on the right side; both again can be close to the hinge. In yet another approach, the dispenser can be at the seat base, while the locking mechanism can be at the carrying platform, or vice versa. In other approaches, there can be more than one such retractable belts. In another embodiment, to increase safety, there can be at least one small handle bar or arm attached to the back surface of the seat base. As the person sits and leans on the back surface, one of his hands can hold onto the small handle bar on the side of the back surface. There can be another small handle bar on the other side of the back surface. Then as the person sits and leans onto the back surface of the seat base, the person will be sitting between the two small handle bars, and the person can hold onto both of them. In yet another embodiment, in addition to a guard rail at the second end, there can be additional guard rails, such as one on each of the two sides, of the carrying platform to further enhance the safety measure. The additional guard rails do not have to extend all the way to the back surface of the seat back.

FIGS. 1-2 do not have to be drawn to scale; they serve as functional representations of different embodiments.

In yet another embodiment, a user can sit on another version of a motorized vehicle or system to go to school, with the system carrying a backpack. The system is typically battery-powered. When the system's power runs out, the user can manually pull or push the backpack system to school. In this embodiment, the system includes a frame with a handle bar around a first end of the frame. Opposite the first end is the second end. Around the second end of the frame, there can be a panel, which can be rectangular. The frame can include two metal shafts connecting the handle bar and the panel. The metal shafts can be hollow. The panel can be oriented substantially perpendicular to the metal shafts.

In one embodiment, a backpack can be on top of the frame. The backpack can include a main compartment, with an organizer panel (e.g. to keep supplies accessible) and a mesh water bottle pocket on the compartment, and accessory pockets on both sides of the compartment. There can also be one or more bungie cords connected to the compartment. Heavy-duty polyester can be used as materials for the backpack. In one approach, the backpack can be positioned from the first end of the frame to, for example, close to the middle of the frame. In another approach, the backpack can be positioned from the second end of the frame to, for example, close to the middle of the frame.

In one embodiment, the backpack is removable or detachable from the frame. This can be done, for example, by Velcro or other mechanisms.

In one embodiment, there can be a seat on top of the frame. The seat can be a single-person seat, positioned behind but close to the handle bar of the frame. In another embodiment, the seat can be folded down when not in use, such as when the system's power is depleted.

In one embodiment, the system can have three or more wheels. For example, there can be one wheel close to the second end of the frame. This wheel can be used for steering (the steering wheel). There can be a brake at the steering wheel. Close to the first end of the frame, there can be one or more other wheels (the first-end wheels). In one approach, there are two first-end wheels. In another approach, there is one first-end wheel, which can have one or more supporting wheels on its side, such as a training wheel on its right and another training wheel on its left. These first-end wheel(s) can be connected by an axle.

In another embodiment, around the middle of the frame, there can be an extra wheel, which can provide additional support for the system. This extra wheel can be a swivel wheel.

In yet another embodiment, close to the intersection of the metal shafts and the panel, there can be two wheels or rollers. These rollers can be close to the two bottom corners of the panel, with one on each side.

In one embodiment, the system can be battery powered. The battery can be supported by a battery tray, which can be held by or attached to the frame. In one approach, the tray with the battery can be positioned between the seat and the main compartment. In another approach, the tray can be below the metal shafts, and a portion of the tray can be below a portion of the seat.

In one embodiment, there can be a motor in between the battery and the first-end wheels. The motor can have a motor gear, and the axel of the first-end wheels can have an axel gear. The motor gear can be connected to the axel gear by a chain. When the motor turns, the motor gear turns the axel gear through the chain. As the axel gear turns, the first-end wheels turn. The speed of the system can depend on the gear ratio between the motor gear and the axle gear. In another embodiment, there can be a switch that changes the polarity of the battery running the motor. This switch can be used to run the system forward or backward by changing the polarity of the battery in running the motor.

In one embodiment, there can be a post. On one end of the post, there can be a steering bar, and on the other end of the post, there can be a fork. The post, above its fork area, can be connected to close to the second end of the frame. Though connected, the post can be rotated relative to the frame. The fork can hold onto the steering wheel. As the steering bar turns, the fork follows, which turns the steering wheel. The steering bar can have two ends, with a throttle at one end of the steering bar. The throttle can be used for motor throttling. There can be a brake lever at the other end of the steering bar to control the brake at the steering wheel.

In another embodiment, the post can be connected to the frame via a hinge contraption. Using the hinge contraption, the user can lift the steering wheel off the ground. In this embodiment, there can be one or more extra wheels other than the first-end wheels and the steering wheel. These extra wheels, positioned between the steering wheel and the first-end wheels, can support the system when the steering wheel is lifted off the ground. In one approach, the hinge can be positioned close to the second end of the frame, above the steering wheel and above the fork.

To operate, for example, first the user charges the battery. After the battery is charged, the user sits on the seat close to the first end of the frame, with his hands holding onto the two ends of the steering bar, and with the soles of his feet, extending towards, touching or pushing onto the panel. A backpack can be positioned close to the panel, below his feet.

In one embodiment, initially, the user uses at least one of his legs to push-start the system by pushing the system forward. As the system starts moving, the user twists the throttle at one end of the steering bar to increase power for the motor. Then the user can comfortably place his legs over or on the sides of the main compartment of the backpack. If the user wants the system to move faster, the user further twists the throttle. As the motor pushes the system forward, the user can lift the steering wheel up from the ground. To turn, the user can push the steering wheel back onto the ground via the hinge, and twists the steering bar. If the user wants the system to slow down or to stop, the user can release the throttle, and press the brake lever.

After the system has stopped, the user can stand up. Then, in one approach, the user can hold onto the handle bar and manually roll the system along using the steering wheel. In another approach, the user can hold onto the handle bar and manually, roll the system along using the rolling wheels. In yet another approach, the user can remove the backpack from the system and walk away with the backpack.

In one embodiment, the system without or with the backpack can be chained to a bike rack or other structures, through the frame of the system, to lock the system down.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A battery-powered motorized vehicle for a user comprising:
   a riding platform with a first end and a second end;
   a first-end wheel dose to the first end of the riding platform;
   a second-end wheel dose to the second end of the riding platform;
   a seat base on top of the riding platform;
   a battery-powered motor configured to drive either the first-end wheel or the second-end wheel;
   a carrying platform with a first end and a second end;
   at least one extra wheel connected to the bottom of the carrying platform;
   a hinge connecting the first end of the carrying platform indirectly through at least one other structure or directly to the seat base; and
   an attachment device configured to secure an article to the carrying platform,
   wherein the carrying platform, via the hinge, can be configured to be in the downward position with the at least one extra wheel touching the ground for carrying the article,
   wherein with no article to be carried, the carrying platform can be configured to be held in an upward position with the at least one extra wheel lifted off the ground, which can make the motorized vehicle more maneuverable,
   wherein the centers of the first-end wheel and the second-end wheel are substantially along a straight line, and
   wherein the centers of the first-end wheel and the second-end wheel are substantially located at the midline along the longitudinal axis of the riding platform.

2. A battery-powered motorized vehicle for a user comprising:
   a riding platform with a first end and a second end;
   a steering wheel close to the first end of the riding platform;
   a second-end wheel close to the second end of the riding platform;
   a seat base on top of the riding platform;
   a battery-powered motor configured to drive the second-end wheel;
   a carrying platform with a first end and a second end;
   at least one extra wheel connected to the bottom of the carrying platform;
   a hinge connecting the first end of the carrying platform directly or indirectly to the seat base; and
   an attachment device configured to secure an article to the carrying platform,
   wherein the carrying platform, via the hinge, can be configured to be in the downward position with the at least one extra wheel touching the ground for carrying the article,
   wherein with no article to be carried, the carrying platform can be configured to be held in an upward position with the at least one extra wheel lifted off the ground, which can make the motorized vehicle more maneuverable,
   wherein the centers of the steering wheel and the second-end wheel are substantially along a straight line,
   wherein the extra wheel is a swivel wheel,
   wherein at least a portion of the attachment device is connected to the carrying platform, and
   wherein the centers of the steering wheel and the second-end wheel are substantially located at the midline along the longitudinal axis of the riding platform.

3. A battery-powered motorized vehicle as recited in claim 1,
   wherein the first-end wheel is a steering wheel and the at least one extra wheel is a swivel wheel, and
   wherein the centers of the three wheels are substantially along a straight line when the carrying platform is in the downward position with the at least one extra wheel touching the ground.

4. A battery-powered motorized vehicle for a user comprising:
   a riding platform with a first end and a second end;
   a first-end wheel close to the first end of the riding platform;
   a second-end wheel close to the second end of the riding platform;
   a seat base on top of the riding platform;
   a battery-powered motor configured to drive either the first-end wheel or the second-end wheel;
   a carrying platform with a first end and a second end;
   at least one extra wheel connected to the bottom of the carrying platform;
   a hinge connecting the first end of the carrying platform indirectly through at least one other structure or directly to a back surface of the seat base;
   an attachment device configured to secure an article to the carrying platform; and
   a brake at the first-end wheel,
   wherein the carrying platform, via the hinge, can be configured to be in the downward position with the at least one extra wheel touching the ground for carrying the article,
   wherein with no article to be carried, the carrying platform can be configured to be held in an upward position with the at least one extra wheel lifted off the ground, which can make the motorized vehicle more maneuverable, wherein the centers of the three wheels are substantially along a straight line when the carrying platform is in the downward position with the at least one extra wheel touching the ground, wherein the first-end wheel is a steering wheel and the at least one extra wheel is a swivel wheel, and wherein the centers of the first-end wheel and the second-end wheel are substantially located at the midline along the longitudinal axis of the riding platform.

5. A battery-powered motorized vehicle as recited in claim 3 further comprising at least one battery in a battery tray attached to the bottom of the riding platform.

6. A battery-powered motorized vehicle as recited in claim 3 wherein the attachment device includes ropes.

7. A battery-powered motorized vehicle as recited in claim 3 further comprising a holding device configured for holding the carrying platform in the upward position, with the swivel wheel not touching the ground.

8. A battery-powered motorized vehicle as recited in claim 7, wherein at least a portion of the attachment device is used for the holding device.

9. A battery-powered motorized vehicle as recited in claim 8, wherein the seat base is connected to a seat back, and wherein the attachment device includes at least a piece of rope, and the holding device is configured to use the at least a piece of rope and the seat back to hold the carrying platform in the upward position.

10. A battery-powered motorized vehicle as recited in claim 3 further comprising an extension arm positioned between the swivel wheel and the carrying platform.

11. A battery-powered motorized vehicle as recited in claim 10, wherein the extension arm is hollow to reduce the weight of the extension arm.

12. A battery-powered motorized vehicle as recited in claim 3 further comprising two supporting wheels, one on each side of the motorized vehicle, the two supporting wheels not configured to touch the ground when the battery-powered motorized vehicle is in its upright position.

13. A battery-powered motorized vehicle as recited in claim 3, wherein the seat base is configured to be used as a container, and the seat base includes a door to access the container.

14. A battery-powered motorized vehicle as recited in claim 13, wherein the door is on a side of the seat base, and the door opens in the direction substantially from the second-end wheel towards the steering wheel.

15. A battery-powered motorized vehicle as recited in claim 13, wherein the door is configured to be at the top surface of the seat base.

16. A battery-powered motorized vehicle as recited in claim 13, wherein the top surface of the seat base extends beyond the door to serve as a cover over the door.

17. A battery-powered motorized vehicle as recited in claim 13 further comprising:

at least one battery in a battery tray attached to the bottom of the riding platform; and an inside door inside the seat base in the area of the container allowing the at least one battery to be accessed via the inside door.

18. A battery-powered motorized vehicle as recited in claim 3, wherein the carrying platform further includes a guard rail close to the second end of the carrying platform.

19. A battery-powered motorized vehicle as recited in claim 3 further comprising a footrest on the riding platform in front of the seat base.

20. A battery-powered motorized vehicle as recited in claim 3, wherein if the carrying platform is carrying an article, the article is a rolling backpack.

21. A battery-powered motorized vehicle as recited in claim 1 further comprising another extra wheel connected to the bottom of the carrying platform, and wherein the two extra wheels are spaced apart, which can enhance stability of the motorized vehicle when the carrying platform is in the downward position with the extra wheels touching the ground.

22. A battery-powered motorized vehicle as recited in claim 20, wherein the attachment device is located in the vicinity of the hinge.

23. A battery-powered motorized vehicle as recited in claim 3, wherein the seat base is connected to a seat back, and wherein at least a portion of the attachment device is connected to the seat base.

* * * * *